May 30, 1939. W. S. VROOMAN 2,160,182

APPARATUS FOR MAKING RUBBER FLOOR COVERINGS

Original Filed March 18, 1933

INVENTOR.
William S. Vrooman
BY Fay, Oberlin & Fay
ATTORNEYS.

Patented May 30, 1939

2,160,182

UNITED STATES PATENT OFFICE 2,160,182

APPARATUS FOR MAKING RUBBER FLOOR COVERINGS

William S. Vrooman, Pontiac, Mich., assignor to The Paine & Williams Company, Cleveland, Ohio, a corporation of Ohio Original application March 18, 1933, Serial No. 661,453. Divided and this application May 17, 1937, Serial No. 143,112

1 Claim. (Cl. 18—19)

This invention relates in general to floor coverings and the like made of or including a layer of vulcanized rubber, but has reference more particularly to contoured rubber floor mats for automobiles and methods of and apparatus for making same.

With the advent of automobiles having bodies of lower center of gravity construction, it has become necessary to provide the floors thereof with various protuberances or humps into which portions of the running gear and operation mechanism extend or into which they may extend during the operation of the car.

Owing to the presence of such protuberances or humps, which may take various forms, it has been impractical to provide properly fitted floor coverings for such contoured floors. The high cost of the necessary molds practically precludes vulcanizing of rubber mats to the desired contour and while it has been attempted thus to mold the contoured portion as a separate piece and then attach the same to the body of the floor covering, this too is expensive and the mat, made of two or more pieces, is unsatisfactory in use.

The present invention, accordingly, has as its primary object the provision of a rubber mat which shall be properly contoured to fit floors having protuberances or humps of the character described. Another object of the invention is to provide an inexpensive method and apparatus for making such contoured rubber mats.

To the accomplishment of the foregoing and related ends, said invention, then, consists of the means and steps hereinafter fully described and particularly pointed out in the claim. The annexed drawing and the following description set forth in detail contain certain mechanism embodying the invention, such disclosed means constituting, however, but one of various structural forms in which the principle of the invention may be used.

Figure 1:
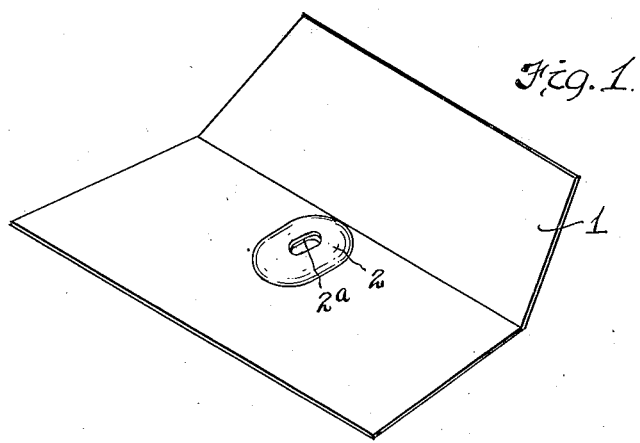
Figure 2:
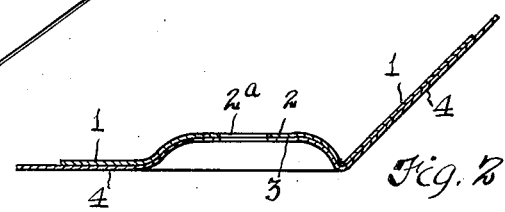
Figure 3:
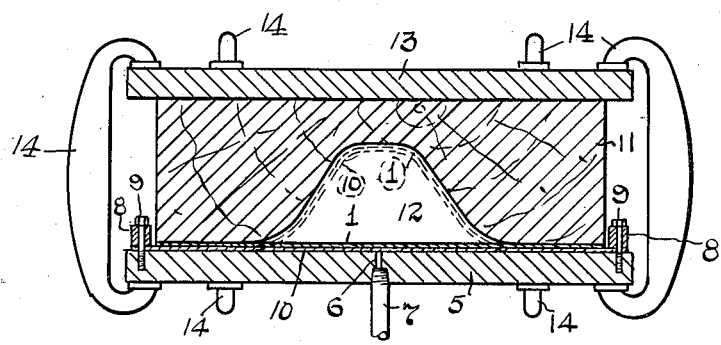
Figure 4:
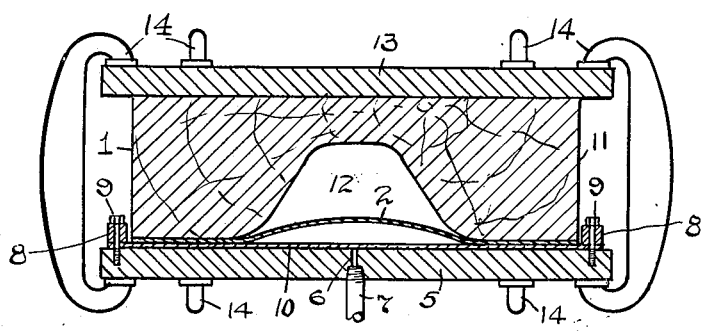

In said annexed drawing:

Fig. 1 is a perspective view of a typical contoured rubber floor mat made in accordance with the present invention; Fig. 2 is a fragmentary longitudinal cross-sectional view through the floor of an automobile showing the contoured mat in position; Fig. 3 is a cross-sectional view, showing in a more or less diagrammatic manner, apparatus which may be used forming a protuberance or hump in a floor mat in accordance with the invention; and Fig. 4 is a view, similar to Fig. 3, but showing the final shape of the protuberance or hump in the mat.

Referring more particularly to the drawing, I have shown in Fig. 1 thereof a typical contoured rubber mat 1 adapted to be used for the floor of the front compartment of an automobile, such mat being provided with a protuberance or hump 2 which is of a shape and size to fit over and snugly engage a similarly shaped protuberance or hump 3 in the floor 4 of the automobile. The protuberance or hump 2 of the mat is perforated as at 2a in order to permit the gear shift lever of the automobile to extend therethrough.

In forming the contoured rubber mat, I preliminarily make a flat rubber mat of the desired outline by means of the usual molding dies, and simultaneously with the molding thereof vulcanize the mat and impart thereto such ornamental surface patterns or designs as may be desired. Vulcanized rubber mats of this character are usually characterized by a rather high degree of permanent set, such property resulting from the grade of rubber stock or compound employed and from the vulcanization thereof.

After removal of the flat rubber mat from the mold, I prefer to subject the mat to the next or protuberance or hump forming operation before it has cooled below about 140° F.

For the purpose of forming the protuberance or hump in the rubber mat, I preferably employ apparatus such as shown in Fig. 3. Such apparatus comprises a base plate or support 5, made of steel or other metal, and having an aperture 6 which is in communication with an inlet tube 7 threadedly secured to the base plate. Mounted on the base plate 5, and removably secured thereto as by means of bars 8 and bolts 9, is a diaphragm 10, made of a high quality of gum rubber having a very low degree of permanent set. The bars 8 engage the marginal portions of the diaphragm and provide an air-tight seal between the diaphragm and the base plate.

The apparatus further includes a die block 11, made of wood or like easily fashioned material, and having a cavity or recess 12 of a size substantially larger than that of the protuberance or hump which it is desired to form in the mat.

The hot rubber mat is placed on the rubber diaphragm 10, the die block 11 being then placed on the mat, with the cavity 12 therein disposed over the portion of the mat in which the protuberance or hump is to be formed. A plate 13, similar to the base plate 5, is then placed on the die block 11 and clamp members 14 are applied, these members being of such size as to be easily slipped into position by hand with the jaws thereof loosely engaging the outermost faces of the plates 5 and 13.

In cases where the mat has been permitted to cool to atmospheric temperatures after removal from the mold, it should be reheated to a temperature of from about 140° F. to about 200° F. before proceeding with the operation to be now described.

With the mat secured in position, as shown in Fig. 3, air or equivalent fluid, under fairly high pressure, from a suitable source of supply (not shown) is introduced through the tube 7 into the confined space between the base plate 5 and the diaphragm 10. The initial effect of the introduction of such pressure fluid into the space in question will be to raise the diaphragm and therewith the mat so as to bring the flat portions of the latter into close contact with the corresponding portions of the block 11. The friction between the lower surface of the die block and the portions of the mat which are thus initially brought in contact therewith is sufficient to effectively lock such portions of the mat against the die block and prevent subsequent stretching or distortion thereof. Thereafter, both the diaphragm and that portion of the mat disposed beneath the cavity 12 are stretched or distorted upwardly to the position indicated in dotted lines in Fig. 3, that is, to the walls of the cavity. The protuberance or hump thus formed in the mat is of a size considerably in excess of the size of the protuberance or hump which it is desired to form in the mat. The diaphragm 10 serves not only as a support or backing for the mat during the formation of the protuberance or hump, but enables the air pressure to be more uniformly distributed over the mat than would be the case if the air were applied directly to the mat; without the use of the diaphragm, it will be readily seen that if any flaws or defects exist in the mat, pressure applied directly to the mat might result in rupture at the defective places therein. It will be understood that in practice, some relative movement may occur between the base plate 5 and die block 11, but the extent of such movement is limited by the clamps 14.

On cutting off the air pressure, the portion of the diaphragm within the cavity, owing to its very low degree of permanent set, will resume its original flat condition, as shown in Fig. 4, but the portion of the mat within the cavity, on account of its high degree of permanent set, will not return to its original flat condition, but to an intermediate position, as shown in Fig. 4, in which position it will have acquired a permanent set, resulting in a protuberance or hump 2 of the desired shape and size. The size and shape of the protuberance or hump will, of course, depend on the size and shape of the cavity in the die block. The degree of stretch or distortion of the mat is ordinarily not so high as to noticeably affect the appearance of the ornamental surface figuring or designs commonly found in rubber mats of the type described.

After the protuberance or hump has been formed in the mat, it may be perforated for any desired purpose, as indicated at 2a in Figs. 1 and 2.

While the aforesaid method has been described particularly with reference to mats in a heated condition, in which condition the various operations can be conducted most efficiently, it will be understood that the method may also be practiced with rubber mats in a normal or unheated condition. It will also be apparent that the present method provides for the use of existing mat molding equipment with the addition of simple and inexpensive apparatus for the protuberance or hump forming operation. Since the protuberance or hump forming operation is not in any sense a molding operation, the walls of the cavity in the die block need not be provided with ornamental patterns or designs corresponding with those of the mat, and the die block 5 may therefore be made of an inexpensive easily fashioned material, such as wood or the like. Although the protuberance or hump could be formed in the mat simultaneously with the molding thereof, it will be obvious that such a method of forming a contoured mat would require new molds made of steel or other heat-resistant material which is relatively expensive as compared with wood, with the consequent obsolescence of existing mat molding equipment. The present method, as previously stated, is designed to make use of existing mat molding equipment.

This application is a division of my co-pending application Serial No. 661,453, filed March 18, 1933.

Other modes of applying the principle of my invention may be employed instead of the one explained, change being made as regards the structure herein disclosed, provided the means stated by the following claim or the equivalent of such stated means be employed.

I therefore particularly point out and distinctly claim as my invention:

Apparatus for making an integral preshaped rubber mat for humped automobile or like floors, such mat having a major portion designed to lie in a single plane and a relatively minor portion contoured to fit the hump in such floor, such apparatus comprising a rigid member having a flat face and a recess or cavity in said face, the area of said recess being less than the area of the remainder of the face, a plate substantially coextensive with said face, means removably securing said plate with said member, a diaphragm marginally sealed to said plate and disposed to lie between the same and such recessed face, connections for introducing fluid pressure between said plate and diaphragm, whereby when a mat is positioned between said diaphragm and the recessed face of said member and fluid pressure is introduced between said plate and diaphragm, the major portion of such mat is first pressed and held against the flat surface of said member and then the portion of the mat overlying said recess is distended and stretched into engagement with the walls of said recess.

WILLIAM S. VROOMAN.